(12) United States Patent
Musch et al.

(10) Patent No.: US 6,767,947 B2
(45) Date of Patent: Jul. 27, 2004

(54) ADHESIVE COMPOSITIONS BASED ON POLYCHLOROPRENE DISPERSIONS

(75) Inventors: Rüdiger Musch, Gladbach (DE); Knut Panskus, Leverkusen (DE); Norbert Schildan, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/954,767

(22) Filed: Sep. 14, 2001

(65) Prior Publication Data

US 2002/0120045 A1 Aug. 29, 2002

(30) Foreign Application Priority Data

Sep. 19, 2000 (DE) ........................ 100 46 545

(51) Int. Cl.⁷ .................................. C08L 93/04
(52) U.S. Cl. .................... 524/273; 524/270; 524/432; 524/433; 428/355 BL
(58) Field of Search ................ 524/764, 834, 524/835, 851, 855, 856, 270, 273, 433, 430, 271

(56) References Cited

U.S. PATENT DOCUMENTS

| | | | |
|---|---|---|---|
| 2,234,215 A | | 3/1941 | Youker .................. 260/89 |
| 3,242,113 A | * | 3/1966 | Kell .................. 260/27 |
| 3,397,173 A | | 8/1968 | Collette et al. .......... 260/45.9 |
| 3,422,045 A | | 1/1969 | Aho .................. 260/27 |
| 3,595,821 A | * | 7/1971 | Spector et al. .......... 260/25 |
| 3,872,043 A | * | 3/1975 | Brandlard et al. ..... 260/23.7 H |
| 3,880,788 A | * | 4/1975 | Rudolphy .............. 260/25 |
| 3,926,880 A | * | 12/1975 | Esser et al. .......... 260/27 BB |
| 3,929,703 A | * | 12/1975 | Weymann et al. ...... 260/27 BB |
| 3,929,752 A | | 12/1975 | Cooper et al. .......... 260/92.3 |
| 3,932,355 A | | 1/1976 | Barney et al. ........ 260/63 HA |
| 3,965,061 A | * | 6/1976 | Bash et al. .......... 260/25 |
| RE29,157 E | * | 3/1977 | Petersen et al. ......... 260/25 |
| 4,124,754 A | | 11/1978 | Miller .................. 526/220 |
| 4,141,875 A | * | 2/1979 | Brizzolara et al. ...... 260/29.7 E |
| 4,212,780 A | * | 7/1980 | Fitzgerald ............. 260/27 BB |
| 4,405,742 A | * | 9/1983 | Musch et al. ........... 524/315 |
| 4,477,613 A | * | 10/1984 | Evans et al. .............. 524/77 |
| 5,053,468 A | * | 10/1991 | Branlard et al. ............ 526/206 |
| 5,298,580 A | * | 3/1994 | Wendling et al. ........... 526/213 |
| 5,332,771 A | * | 7/1994 | Christell ................. 524/270 |
| 5,407,993 A | * | 4/1995 | Lyons et al. ............... 524/501 |
| 5,527,846 A | * | 6/1996 | Christell et al. ........... 524/273 |
| 5,552,519 A | * | 9/1996 | Hemmings et al. ......... 530/216 |
| 5,667,858 A | * | 9/1997 | Pokorny .................. 428/41.8 |
| 2002/0120045 A1 | * | 8/2002 | Musch et al. ............. 524/285 |

FOREIGN PATENT DOCUMENTS

| | | | |
|---|---|---|---|
| DE | 32 46 748 A1 | 6/1984 | |
| GB | 1082549 | * 9/1967 | ............ C08D/9/12 |
| GB | 1 414 393 | 11/1975 | |
| GB | 1 469 993 | 4/1977 | |
| JP | 60-31510 | 2/1985 | |
| WO | 94/13703 | 6/1994 | |

OTHER PUBLICATIONS

Fiebach, K. in Ullman's Encyclopedia of Industrial Chemistry Elvers, B. Hawkins, S., Russey, W., Schulz, G., Eds.; vol. A23, VCH Publishers, New York: 1993, p. 86.*
Adhesives Age, Feb. 1992 vol. 2 pp. 28–31, CR Dispersions Delveloped To Match SB Adhesives, H.W. Lucas, H. Konigshofen and O. Ganster.
Methoden Der Organischen Chemie, vol. SVI/1, (month unabailable) 1961 pp. 738–739, H. Logemann: Polymerisation der wichtigsten Monomeren.
Encyclopedia of Polymer Science and Technology, vol. 3, (date unavailable) pp. 705–730, 2–Chlororobutadiene Polymers.
Ullmanns Ency. der tech. Chemie (month unavailable) 1957, pp. 366–367, Kautschuk.

* cited by examiner

Primary Examiner—David W. Wu
Assistant Examiner—Rip A. Lee
(74) Attorney, Agent, or Firm—Joseph C. Gil; Gary F. Matz; Thomas W. Roy

(57) ABSTRACT

The present invention relates to adhesive compositions containing a polychloroprene dispersion containing a tricyclic diterpenecarboxylic acid having at least two conjugated C=C double bonds per molecule.

The present invention also relates to a process for preparing these adhesive compositions and to their use as contact adhesives for organic and inorganic substrates.

16 Claims, No Drawings

ADHESIVE COMPOSITIONS BASED ON POLYCHLOROPRENE DISPERSIONS

BACKGROUND OF THE INVENTION

1. Field of the Invention

The present invention relates to adhesive compositions based on polychloroprene dispersions having improved adhesive properties, to a process for the preparation thereof, and to their use as a contact adhesive for inorganic or organic substrates.

2. Description of the Prior Art

The preparation of polychloroprene by emulsion polymerization in an aqueous-alkaline medium is known and described in "Ullmanns Encyclopädie der technischen Chemie", Volume 9, p. 366, Verlag Urban und Schwarzenberg, Munich-Berlin 1957; "Encyclopedia of Polymer Science and Technology", Vol. 3, p. 705–730, John Wiley, New York 1965; and "Methoden der Organischen Chemie" (Houben-Weyl) XIV/1, 738 et seq. Georg Thieme Verlag Stuttgart 1961.

Suitable emulsifiers include, in principle, all compounds and mixtures thereof that stabilize the emulsion sufficiently, such as water-soluble salts, especially sodium, potassium and ammonium salts, of long-chained fatty acids, colophony and colophony derivatives; higher molecular weight alcohol sulfates; arylsulfonic acids; formaldehyde condensation products of arylsulfonic acids; non-ionic emulsifiers based on polyethylene oxide and on polypropylene oxide; and polymers having an emulsifying action, such as polyvinyl alcohol (DE-A 2 307 81 1, DE-A 2 426 012, DE-A 2 514 666, DE-A 2 527 320, DE-A 2 755 074, DE-A 3 246 748, DE-A 1 271 405, 1 301 502, U.S. Pat. No. 2,234,215, JP-A 60-31 510 (=58-136 824 of 28, Jul. 1983)).

Polychloroprene is used either, after appropriate compounding and vulcanization, in the manufacture of technical rubber articles, or it is used as a raw material for contact adhesives ("Handbook of adhesives", Chapter 21, Verlag Van Nostrand Reinhold, New York, 2nd edition 1977).

Polychloroprene-based contact adhesives are predominantly solvent-based adhesives that are applied to the two parts to be bonded and allowed to dry. By subsequently joining the two parts under pressure, a bond having high strength is obtained. In the case of solvent-based contact adhesives, the long period of time within which bonding is possible at room temperature ("open time") is regarded as particularly advantageous.

For ecological and economic reasons there is a growing need for suitable aqueous polychloroprene dispersions that can be processed to corresponding aqueous adhesive formulations. However, such formulations have the disadvantage that, after evaporation of the water, the "open time"—in comparison with solvent-based adhesives—is markedly shorter. In the case in particular of the addition of high-melting resins, which increase the resistance of the bonds to heat, readily reproducible contacting of the substrates to be bonded, especially in the case of substrates that are not very absorbent or are non-absorbent, can be achieved only by previous heat activation of the dry adhesive film (H. W. Lucas in "Adhesives Age" 1992, Volume 2, p. 28).

In the present application, "open time" is defined as the interval between the time at which the applied adhesive is sufficiently dry to permit bonding of the substrates and the time at which it is no longer possible to achieve a satisfactory bond at room temperature simply by applying pressure.

Accordingly, it is an object of the present invention to provide an aqueous adhesive composition based on an aqueous polychloroprene dispersion, in which the composition, after evaporation of the water, possesses a long "open time" during which bonding is possible at room temperature without heat activation. It is an additional object of the present invention to obtain an improvement in the heat resistance of the contact adhesive.

The first object can be achieved with the aqueous adhesive compositions based on polychloroprene dispersions, which can be obtained by the continuous polymerization of chloroprene in aqueous emulsion in the presence of unmodified resin acids as emulsifiers. The aqueous dispersions of adhesive raw materials can then be processed with known adhesive additives to form adhesive compositions that have a sufficiently long "open time" that bonding is possible at room temperature without heat activation. The second object can be achieved by adding a high-melting resin to the adhesive composition.

SUMMARY OF THE INVENTION

The present invention relates to adhesive compositions containing a polychloroprene dispersion containing a tricyclic diterpenecarboxylic acid having at least two conjugated C=C double bonds per molecule.

The present invention also relates to a process for preparing these adhesive compositions and to their use as contact adhesives for organic and inorganic substrates.

DETAILED DESCRIPTION OF THE INVENTION

Preferred adhesive compositions are those containing 100 parts by weight of a polychloroprene dispersion containing as emulsifier a tricyclic diterpenecarboxylic acid having at least two conjugated C=C double bonds per molecule, from 15 to 75 parts by weight of an adhesive resin, from 1 to 10 parts of a metal oxide selected from zinc oxide and magnesium oxide, and, optionally, further auxiliary substances and additives, all of which are present in the form of a dispersion.

The polychloroprene dispersion contained in the adhesive composition according to the invention is obtained by emulsion polymerization of chloroprene and 2 to 20 parts by weight of an ethylenically unsaturated monomer that is copolymerizable with chloroprene, in an alkaline medium in the presence of from 1 to 10 parts by weight of a tricyclic diterpenecarboxylic acid having at least two conjugated C=C double bonds per molecule as emulsifier; all amounts are based on 100 parts by weight of the two monomers.

The polychloroprene dispersion contained in the adhesive composition according to the invention has, after evaporation of the water, an "open time" of 4 to 15 days.

Suitable copolymerizable monomers are described, for example, in "Method en der Organ ischen Chemie" (Houben-Weyl) XIV/1, 738 et seq. Georg Thieme Verlag Stuttgart 1961. Preferred are compounds having 3 to 12 carbon atoms and 1 or 2 copolymerizable C=C double bonds per molecule. Examples of preferred copolymerizable monomers are 2,3-dichlorobutadiene and 1-chlorobutadiene.

The emulsion polymerization is carried out at 0 to 70° C., preferably 5 to 50° C., and a pH of 10 to 14, preferably 11 to 13. Activation is effected by known activators or activator systems. Examples include formamidine-sulfonic acid, potassium peroxodisulfate, redox systems based on potassium peroxodisulfate and, optionally, silver salt (Na salt of anthraquinone-β-sulfonic acid). Suitable redox partners include compounds such as formamidinesulfinic acid, Na salt of hydroxymethanesulfinic acid, sodium sulfite and sodium dithionite. Redox systems based on peroxides and hydroperoxides are also suitable. The preparation of the polychloroprenes according to the invention may be carried out either continuously or discontinuously.

To adjust the viscosity of the polychloroprenes according to the invention, known chain-transfer agents may be used, such as the mercaptans described in DE-A 3 002 711, GB-B 1 048 235, FR-2 073 106, or the xanthogen disulfides described in DE-A 1 186 215, DE-A 2 156 453, 2306 610 and 3 044 811,EP-A 53 319, GB-B 512 458 and 952 156 and U.S. Pat. Nos. 2,321,693 and 2,567,117.

Especially preferred chain-transfer agents are n-dodecylmercaptan and the xanthogen disulfides used in DE-A 3 044 811, DE-A 2 306 610 and DE-A 2 156 453.

After carrying out the polymerization to the desired conversion, which is usually from 50 to 80% in the case of soluble polychloroprene and over 80% in the case of polychloroprene gel, it is advantageous to terminate the reaction by adding known terminating agents, such as tert-butylcatechol, phenothiazine and diethylhydroxylamine. Unreacted monomers can be removed with the aid of water vapor and vacuum.

In a preferred embodiment of the emulsion polymerization process according to the invention, chloroprene is reacted with 5 to 9 parts by weight of 2,3-dichlorobutadiene in the presence of 2.0 to 6.0 parts by weight of a tricyclic diterpenecarboxylic acid having at least two conjugated C=C double bonds per molecule as emulsifier; all amounts are based on the total weight of the polymerizable monomers that are used.

The tricyclic diterpenecarboxylic acids to be used according to the invention may be employed in the form of the crude, unmodified resin acids (S. W. Barendrecht, L. T. Lees in Ullmanns Encyclopädie der Technischen Chemie, 4th edition, Vol. 12. 528–538, Verlag Chemie, Weinheim—New York 1976), which are obtained from tall oil, common rosin or root resin, provided they are free of distillable constituents of terpentine oil. If the tricyclic diterpenecarboxylic acids themselves are readily obtainable, they may also be used in pure form. Suitable tricyclic diterpenecarboxylic acids include, for example, abietic acid, palustric acid, neoabietic acid and levopimaric acid.

The type and amount of tricyclic, conjugated unsaturated diterpenecarboxylic acids may be determined from a mixture of resin acids by gas chromatography; for example, according or analogously to J. Amer. Oil Chem. Soc. 54, 289 (1977).

If an unmodified resin acid obtained from tall oil, common rosin or root resin is used, it contains not only tricyclic, conjugated unsaturated diterpenecarboxylic acids, but also other constituents. Without constituting any limitation, the following resin acid obtained from tall oil and having the composition indicated below is an example of a suitable commercially available unmodified resin acid.

| | Amount in % |
|---|---|
| abietic acid | 40 |
| neoabietic acid | 4 |
| palustric acid | 7 |
| pimaric acid | 3 |
| isopimaric acid | 6 |
| dehydroabietic acid | 23 |
| other resin acids | 12 |
| sum of all resin acids | 95 |
| fatty acids | 2 |
| combined acids | 1 |
| unsaponifiable constituents | 2 |

(from the company leaflet of Bergvik Kemi AB, Söderhamn, Sweden)

Another example is an unmodified resin acid obtained from common rosin:

| | Amount in % |
|---|---|
| abietic acid | 46 |
| neoabietic acid | 16 |
| palustric acid | 18 |
| pimaric acid | 8 |
| isopimaric acid | 1 |
| other resin acids | 10 |

In addition to the tricyclic, conjugated, unsaturated diterpenecarboxylic acids, other emulsifiers may additionally be used, such as the water-soluble salt of the condensation product of naphthalenesulfonic acid and formaldehyde.

The adhesive composition according to the invention is free from or has a low content of organic solvents, i.e., less than 30 wt. % of organic solvent, based on the finished adhesive.

In addition to the polychloroprene dispersion, the adhesive compositions according to the invention optionally contain the known additives conventionally employed in adhesives. Examples include fillers such as quartz powder, quartz sand, highly dispersed silica, heavy spar, calcium carbonate, chalk, dolomite or talcum and wetting agents such as polyphosphates (e.g., sodium hexametaphosphate), naphthalenesulfonic acid, ammonium or sodium polyacrylic acid salts. The fillers are preferably added in amounts of 10 to 60%, more preferably 20 to 50 wt. %, based on adhesive composition, and the wetting agents are preferably added in amounts of 0.2 to 0.6 wt. %, based on the filler.

Other additives include zinc oxide, which is used as an acceptor for small amounts of hydrogen chloride that may be liberated by the polymers. Also suitable are organic thickening agents, such as cellulose derivatives, alginates, starch, starch derivatives or polyacrylic acid, which are preferably used in amounts of 0.01 to 1 wt. %, based on adhesive, or inorganic thickening agents, such as bentonites, which are preferably used in amounts of 0.05 to 5 wt. %, based on adhesive.

For preservation purposes, fungicides may also be added to the adhesive compositions according to the invention. They are generally used in amounts of 0.02 to 1.0 wt. %, based on adhesive. Suitable fungicides include phenol derivatives, cresol derivatives and organotin compounds.

Other additives include tackifying resins in dispersed form, such as unmodified or modified natural resins. Examples include rosin esters, hydrocarbon resins or synthetic resins such as phthalate resins, as described, e.g., in "Klebharze" R. Jordan, R. Hinterwaldner, p. 75–115, Hinterwaldner Verlag Munich 1994. Preference is given to alkylphenol resin dispersions having softening points above 110° C., with special preference being given to a terpenephenol resin having a softening point above 110° C.

Suitable organic solvents include toluene, xylene, butyl acetate, methyl ethyl ketone, ethyl acetate, dioxane or mixtures thereof. Other suitable additives include plasticizers such as those based on adipate, phthalate or phosphate.

The adhesives according to the invention can be used for bonding any desired substrates of the same type or different types. Examples include wood, paper, plastics, textiles, leather, rubber and inorganic materials, such as ceramics, stoneware or asbestos cement.

The aqueous adhesive compositions according to the invention cna also be used to bond substrates that are difficult to bond, such as thermoplastic olefins (TPO), or ethylene-vinyl acetate copolymers (EVA) having a high ethylene content, which otherwise cannot be bonded unless the surface is pretreated with a primer. Substrates that are difficult to bond are understood as being materials having a surface tension below 35 mN/m. The determination of surface tension is described, for example, in "Handbook of adhesives", Chapter 1, p. 12, Verlag Van Nostrand Reinhold, New York, 2nd edition 1977, or in "Strukturelles Kleben und Dichten", Schindel-Bidinelli, Vol. 1, p. 191, Hinterwaldner Verlag, Munich 1988.

The invention is further illustrated but is not intended to be limited by the following examples in which all parts and percentages are by weight unless otherwise specified.

EXAMPLES

A) Preparation of Polychloroprene Dispersions

Polymerization is carried out by means of a Konti process, as described in EP-A 0 032 977 (U.S. Pat. No. 4,521,576)

Example 1 (Comparison Example)

Into the first reactor of a polymerization cascade containing 7 identical reactors each having a volume of 50 liters were introduced aqueous phase (W) and monomer phase (M) via a measuring and control apparatus, in a constant ratio, and activator phase (A). The mean dwell time per reactor is 25 minutes. The reactors correspond to those described in DE-A 2 650 714 (U.S. Pat. No. 4,125,697). The amounts are in parts by weight per 100 g parts by weight of monomers used.

| (M) = monomer phase: | |
|---|---|
| chloroprene | 93.0 parts by weight |
| 2,3-dichlorobutadiene-(1,3) | 7.0 parts by weight |
| n-dodecylmercaptan | 0.22 part by weight |
| phenothiazine | 0.015 part by weight |
| (W) = aqueous phase: | |
| demineralized water | 115.0 parts by weight |
| sodium salt of a disproportionated abietic acid | 2.6 parts by weight |
| sodium salt of a condensation product of naphthalenesulfonic acid and formaldehyde | 0.7 parts by weight |
| potassium hydroxide | 1.0 part by weight |
| (A) = activator phase: | |
| 1% aqueous formamidinesulfinic acid solution | 0.05 part by weight |

The reaction began readily at an internal temperature of 40° C. By means of external cooling, the heat of polymerization that was liberated was dissipated and the polymerization temperature was maintained at 45° C. At a monomer conversion of 66%, the reaction was terminated by addition of phenothiazine. The residual monomer was removed from the polymer by water-vapor distillation and the polymer latex was creamed by addition of alginate, as described in "Neoprene Latices, John C. Carl, E. I. Du Pont 1964, p. 13".

The viscosity of the latex was 100 mPa.s and the solids content was 58%.

After a polymerization time of 120 hours, the polymerization line was complete.

Example 2 (Example According to the Invention)

The procedure of the first example was followed, but in the aqueous phase the disproportionated abietic acid was replaced by the same amount of unmodified resin acid based on tall oil.

The viscosity of the latex was 104 mPa.s and the solids content was 58%.

Example 3 (Comparison Example)

The procedure described in Example 1 was followed, but the 7 parts of 2,3-dichlorobutadiene were replaced by chloroprene and the conversion was increased to 85%. After the creaming process, a dispersion having a solids content of 56% and a viscosity of 105 mPa.s was obtained. The polymer was gelled to the extent of 60%.

Example 4 (Comparison Example)

The polymerization was carried out as described in Example 1, but at 10° C. and without 2,3-dichlorobutadiene.

| (M) = monomer phase: | |
|---|---|
| chloroprene | 100.0 parts by weight |
| n-dodecylmercaptan | 0.13 part by weight |
| phenothiazine | 0.015 part by weight |
| (W) = aqueous phase: | |
| demineralised water | 115.0 parts by weight |
| sodium salt of a disproportionated abietic acid | 2.6 parts by weight |
| sodium salt of a condensation product of naphthalenesulfonic acid and formaldehyde | 0.7 part by weight |
| potassium hydroxide | 1.0 part by weight |
| (A) = activator phase: | |
| 1 wt. % aqueous formamidinesulfinic acid | 0.07 part by weight |
| potassium persulfate | 0.05 part by weight |
| anthraquinone-2-sulfonic acid Na | 0.005 part by weight |

The reaction started in the first reactor of the cascade at an internal temperature of 15° C. By means of external cooling, the heat of polymerization that was liberated was dissipated and the polymerization temperature was lowered to 10° C. At a monomer conversion of 80%, the reaction was terminated by addition of phenothiazine. The residual monomer was removed from the polymer by water-vapor distillation, and the polymer latex was creamed.

After a polymerization time of 4 days, the polymerization line was complete.

A dispersion having a solids content of 56% and a viscosity of 98 mPa.s was obtained.

B) Measuring Methods

1) Determination of the Gel Content

The dispersion was applied to a glass plate and dried for 3 days at room temperature under a nitrogen atmosphere to a film. 250 mg samples were dissolved or swelled in 25 ml of THF (to which one polymerization inhibitor per liter of THF had been added) for 24 hours at room temperature in a closed vessel. The mixture was subjected to ultracentrifugation for one hour at 20,000 rpm and the amount by weight of the material that had been centrifuged off was determined after drying.

2) Determination of Peel Strength

The test was carried out according to EN 1392. A 100 μm thick wet film of the dispersion was applied to two test specimens (Nora rubber, roughened, 100×30 mm) and exposed to the air for one hour at room temperature. The specimens were then joined together for 10 seconds at 4 bar. A tearing test on a commercial tensile testing machine was then carried out at room temperature. The strength values were determined immediately after bonding, after 1 day and after 9 days.

3) Measurement of the Contact Adhesion Time on Polyester ("open time")

Polyester Film (Hostaphan RN 75/0, thickness: 0.075 mm) was used, and the dispersions were applied in a width of 5 mm using a film-spreading device with a gap opening of the blade of 0.2 mm. The polyester strips provided with the adhesive dispersion were stored in an air-conditioned chamber at 23° C. and 50% relative humidity. At 12-hour intervals, two strips of cardboard were crossed and subjected to a 50 g weight for 10 seconds. The end of the contact adhesion time was exceeded when, in the parting test by hand, the films can no longer be kept in contact.

C) Preparation According to the Invention of an Adhesive Based on a Polychloroprene Dispersion For the preparation of the formulation, the polychloroprene dispersion was placed in a glass beaker. With stirring, the stabilizer, the anti-aging agent, ZnO and the resin were added.

TABLE 1

Preparation of the formulation for the comparison tests

| Product | Function | Addition in the form of | Solids content (%) | Parts by weight |
|---|---|---|---|---|
| Polychloroprene dispersion | polymer | dispersion | 55–58 | 70 |
| Rhenofit DDA-EM 50 (1) | anti-ageing agent | dispersion | 50 | 2 |
| Emulvin W (2) | stabilizer | solution | 20 | 2 |
| Akrosperse W-9804 (3) | ZnO | dispersion | 50 | 4 |
| Alresen VPT 1550 (4) | resin | dispersion | 50 | 30 |

Suppliers:
(1), (2) = Bayer AG,
(3) = Akrochem, Akron/Ohio USA,
(4) = Vianova Resins Mainz-Kastel, Germany Measurement of the "Open Time"

TABLE 2

Measurement of the contact adhesion time on polyester film

| Contact adhesion time | 12 h | 24 h | 32 h | 3 d | 6 d | 9 d | 12 d | 24 | 25 d |
|---|---|---|---|---|---|---|---|---|---|
| Dispersion 4 | yes | no | | | | | | | |
| Dispersion 3 | yes | yes | no | | | | | | |
| Dispersion 1 | yes | yes | yes | yes | yes | no | | | |
| Dispersion 2 *) | yes | yes | yes | yes | yes | yes | yes | yes | no |

*) example according to the invention

Measurement of the Peel Strength

TABLE 3

Measurement of the strength of foam/metal bonds in dependence on the open time
(a PU foam was bonded to ST37 steel)

| Storage time before bonding in hours | | Dispersion no. | | | |
|---|---|---|---|---|---|
| | | 4 | 3 | 1 | 2*) |
| 1 | N/mm | 0.8 | 1.0 | 0.5 | 0.7 |
| 12 | N/mm | 0.4 | 1.2 | 1.2 | 1.3 |
| 24 | N/mm | 0 | 0.8 | 0.9 | 1.3 |
| 96 | N/mm | 0 | 0.2 | 0.5 | 1.2 |
| 144 | N/mm | 0 | 0 | 0 | 1.2 |

*)example according to the invention

The unusually long "open time" of the polychloroprene dispersion according to the invention was demonstrated in Table 2 in Example 2. The adhesion to non-absorbent substrates such as steel (Table 3, no. 2) was also excellent in comparison with adhesive formulations based on the other polychloroprene dispersions even after a storage time of 6 days.

Evaluation of the Adhesion to TPO

After application of the adhesive dispersion, the material was dried for 24 hours at RT and the adhesion of the adhesive film to the TPO substrate (DOW Engage type) was tested.

TABLE 4

Measurement of the adhesion to TPO

| | Dispersion no. | | | |
|---|---|---|---|---|
| | 4 | 3 | 1 | 2*) |
| Evaluation of the adhesion to TPO | Adhesive film dry, can readily be removed from the substrate | Adhesive film dry, can readily be removed from the substrate | Adhesive film tacky, but little adhesion to TPO | Adhesive film tacky, strong adhesion to TPO |

In the case of Comparison Tests 3 and 4, the dry adhesive film can be removed from the TPO substrate without difficulty (no adhesion to TPO). In the case of Comparison Test 1, the dry adhesive film exhibited slight adhesion to the TPO substrate. Only with the adhesive composition according to the invention have adhesive films been produced that have excellent adhesion. When an attempt was made to remove the dry adhesive film from the TPO, the adhesive film was torn because the adhesion to TPO was too strong.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An adhesive composition comprising i) a polychloroprene dispersion, ii) at least one adhesive resin, and iii) a thickening agent; wherein the polychloroprene dispersion i) is a reaction product of an emulsion polymerization that comprises a) chloroprene, b) at least one ethylenically unsaturated monomer that is copolymerizable with chloroprene and c) as emulsifier, an unmodified resin acid comprising at least 40% by weight of abietic acid, and wherein the thickening agent comprises one or more thickening agents present in the adhesive composition at from 0.01 to 1 wt. %, based on the adhesive composition.

2. The adhesive composition of claim 1, wherein the thickening agent is one or more materials selected from the groups consisting of cellulose derivatives, alginates, starch, starch derivatives or polyacrylic acid.

3. The adhesive composition of claim 1, wherein the thickening agent comprises one or more inorganic thickening agents.

4. The adhesive composition of claim 1, wherein the inorganic thickening agent comprises bentonite.

5. The adhesive composition of claim 1 wherein the adhesive resin comprises a terpenephenol resin having a softening point above 110° C.

6. The adhesive composition of claim 1, wherein the emulsifier includes other tricyclic diterpenecarboxylic acids having at least two conjugated C=C double bonds per molecule.

7. The adhesive composition of claim 1 wherein the adhesive composition has an open time after evaporation of the water of 4 to 15 days.

8. A contact adhesive for bonding inorganic or organic substrates comprising the adhesive composition of claim 1.

9. An adhesive composition comprising 100 parts by weight of i) a polychloroprene dispersion, 15 to 75 parts by weight of the ii) at least one adhesive resin, 0.05 to 5 wt. % based on the adhesive composition of iii) a thickening agent; and 1 to 10 parts of zinc oxide or magnesium oxide, wherein the polychloroprene dispersion i) is a reaction product of an emulsion polymerization that comprises a) chloroprene, b) at least one ethylenically unsaturated monomer that is copolymerizable with chloroprene and c) as emulsifier, an unmodified resin acid comprsing at least 40% by weight of abietic acid.

10. The adhesive composition of claim 9 wherein the adhesive resin comprises a terpenephenol resin having a softening point above 110° C.

11. The adhesive composition of claim 9, wherein the thickening agent is one or more materials selected from the groups consisting of cellulose derivatives, alginates, starch, starch derivatives or polyacrylic acid.

12. The adhesive composition of claim 9, wherein the thickening agent comprises one or more inorganic thickening agents.

13. The adhesive composition of claim 12, wherein the inorganic thickening agent comprises bentonite.

14. The adhesive composition of claim 9, wherein the emulsifier includes other tricyclic diterpenecarboxylic acids having at least two conjugated C=C double bonds per molecule.

15. The adhesive composition of claim 9 wherein the adhesive composition has an open time after evaporation of the water of 4 to 15 days.

16. A contact adhesive for bonding inorganic or organic substrates comprising the adhesive composition of claim 9.

* * * * *